(12) United States Patent
Bertsch (10) Patent No.: US 7,938,332 B2
(45) Date of Patent: May 10, 2011

(54) PUSHMATIC SMART CARD CONNECTOR

(75) Inventor: Michael Steffen Bertsch, Heilbronn (DE)

(73) Assignee: Amphenol-Tuchel Electronics GmbH, Heilbronn (DE)

( * ) Notice: Subject to any disclaimer, the term of this patent is extended or adjusted under 35 U.S.C. 154(b) by 653 days.

(21) Appl. No.: 11/660,212

(22) PCT Filed: Aug. 19, 2005

(86) PCT No.: PCT/EP2005/009000
§ 371 (c)(1),
(2), (4) Date: Aug. 16, 2007

(87) PCT Pub. No.: WO2006/021384
PCT Pub. Date: Mar. 2, 2006

(65) Prior Publication Data
US 2007/0295819 A1    Dec. 27, 2007

(30) Foreign Application Priority Data

Aug. 20, 2004   (DE) .......................... 10 2004 040 448

(51) Int. Cl.
*G06K 7/00* (2006.01)
(52) U.S. Cl. ........................................ 235/486; 235/441
(58) Field of Classification Search .................. 235/441, 235/486
See application file for complete search history.

(56) References Cited

U.S. PATENT DOCUMENTS
4,814,593 A    3/1989  Reichardt et al.
(Continued)

FOREIGN PATENT DOCUMENTS
DE    3518247 A1    11/1986
(Continued)

OTHER PUBLICATIONS
International Search Report, Dec. 6, 2005.

*Primary Examiner* — Daniel A Hess
*Assistant Examiner* — Paultep Savusdiphol
(74) *Attorney, Agent, or Firm* — Blank Rome LLP (57) ABSTRACT

The invention relates to a pushmatic smart card connector comprising a housing into which a smart card or card having two longitudinal edges, a front edge, and a rear edge can be inserted into a reading position in which the smart card contacts located on the smart card are in contact with contact elements disposed directly or indirectly in the housing, a card ejection slide that is movably disposed in the housing and is moved or can be displaced from a neutral position into a locked position counter to the force of a card ejection spring when the smart card is inserted, said card ejection spring gripping the card ejection slide, means for locking the card ejection slide in the locked position thereof and releasing the card ejection slide so as to move the card ejection slide into the neutral position thereof in order for the smart card to be ejected, and a card locking slide which engages with the rear edge of the card and locks the smart card in the reading position when the card is inserted into the reading position thereof. The inventive pushmatic smart card connector is characterized in that the card locking slide initially is not made to move when the smart card is inserted in order to move the card ejection slide from the neutral position thereof into the reading position thereof such that the card ejection slide is provided with greater lift than the card locking slide.

16 Claims, 10 Drawing Sheets

U.S. PATENT DOCUMENTS

| | | | |
|---|---|---|---|
| 5,331,144 A | 7/1994 | Shima et al. | |
| 5,674,080 A * | 10/1997 | Takemura | 439/159 |
| 6,045,377 A * | 4/2000 | Kajiura | 439/159 |
| 6,138,916 A | 10/2000 | Zolkos et al. | |
| 6,155,853 A * | 12/2000 | Kajiura | 439/159 |
| 6,270,365 B1 * | 8/2001 | Nishioka | 439/159 |
| 6,319,029 B2 * | 11/2001 | Nishioka | 439/159 |
| 6,338,636 B2 * | 1/2002 | Nishioka | 439/157 |
| 6,341,727 B1 | 1/2002 | Canard et al. | |
| 6,367,700 B1 * | 4/2002 | Kanayama et al. | 235/475 |
| 6,382,508 B1 | 5/2002 | Bleier | |
| 6,482,020 B1 * | 11/2002 | Yeh | 439/159 |
| 6,643,125 B2 | 11/2003 | Nabetani et al. | |
| 6,652,299 B2 | 11/2003 | Sato | |
| 6,652,300 B2 * | 11/2003 | Nishioka | 439/159 |
| 6,655,972 B2 | 12/2003 | Sato | |
| 6,736,318 B2 * | 5/2004 | Reichardt et al. | 235/441 |
| 2001/0008815 A1 * | 7/2001 | Zuin | 439/327 |
| 2002/0003476 A1 * | 1/2002 | Reichardt et al. | 340/572.1 |
| 2004/0009690 A1 | 1/2004 | Natori | |
| 2004/0190386 A1 * | 9/2004 | Nakakubo et al. | 369/30.03 |
| 2005/0101174 A1 * | 5/2005 | Harasawa | 439/327 |

FOREIGN PATENT DOCUMENTS

| | | |
|---|---|---|
| DE | 195 13 359 C1 | 7/1996 |
| DE | 19513359 C1 | 7/1996 |
| EP | 0167356 A2 | 1/1986 |
| EP | 03 63 992 A2 | 4/1990 |
| EP | 1 170 692 | 1/2002 |
| JP | 11242722 A | 9/1999 |
| JP | 2000340293 A | 12/2000 |

* cited by examiner

Entriegelter Zustand

Darstellung ohne Deckel, ohne Karte

Verriegelter Zustand

Darstellung ohne Deckel, ohne Karte

PUSHMATIC SMART CARD CONNECTOR

The invention relates to smart card connector having a housing and into which a smart card (called below a "card") can be inserted. In the inserted position of the card, contact elements located in the housing come into contact with the card contacts provided on the card. At the time the card is pushed into the housing into its reading position, a card ejection slide movably mounted in the housing as well as a card locking slide are moved together with the card, and locking means are provided to lock the card in the reading position as soon as the reading position is reached. For smart card connectors of the type initially referred to because of the stroke or path of movement by means of which the card is ejected in a defined manner due to the stroke or path of movement of the card ejection slide is limited due to the stroke or path of movement of the card locking slide. It is also necessary to provide a spring for the card locking slide as well as the card ejection slide. Moreover, known smart card connectors are of a relatively complicated design and require numerous parts.

In accordance with the invention, a pushmatic smart card connector in accordance with claim 1 is provided. Preferred embodiments of the invention can be gathered from the dependent claims.

The smart card connector of the invention comprises a card locking slide which is coupled with the card ejection slide such that initially when the card is slid in or inserted due to the movement of the card ejection slide from a rest position into a reading position, no movement of the card locking slide is effected so that the card ejection slide has a larger stroke or path of movement than the card locking slide. Thus, at the time the card locking is finished, the card is ejected in a defined manner by means of the spring force of the card ejection slide so that the card can easily be grasped with the fingers. Moreover, the smart card connector of the invention is of a flat design with a cover for covering the movable parts and also to increase the possibility for stacking the smart card connector.

Further advantages, objects and details of the invention can be gathered from the description of an embodiment shown in the drawing; in the drawing.

FIGS. 1 to 7 show a pushmatic smart card connector 10 in its de-locked condition in a rest position with a smart card or card 11 not completely being inserted. FIG. 8 through 15 show the smart card connector 10 in a locked condition where the card is in a locked card reading position.

Figure 1:
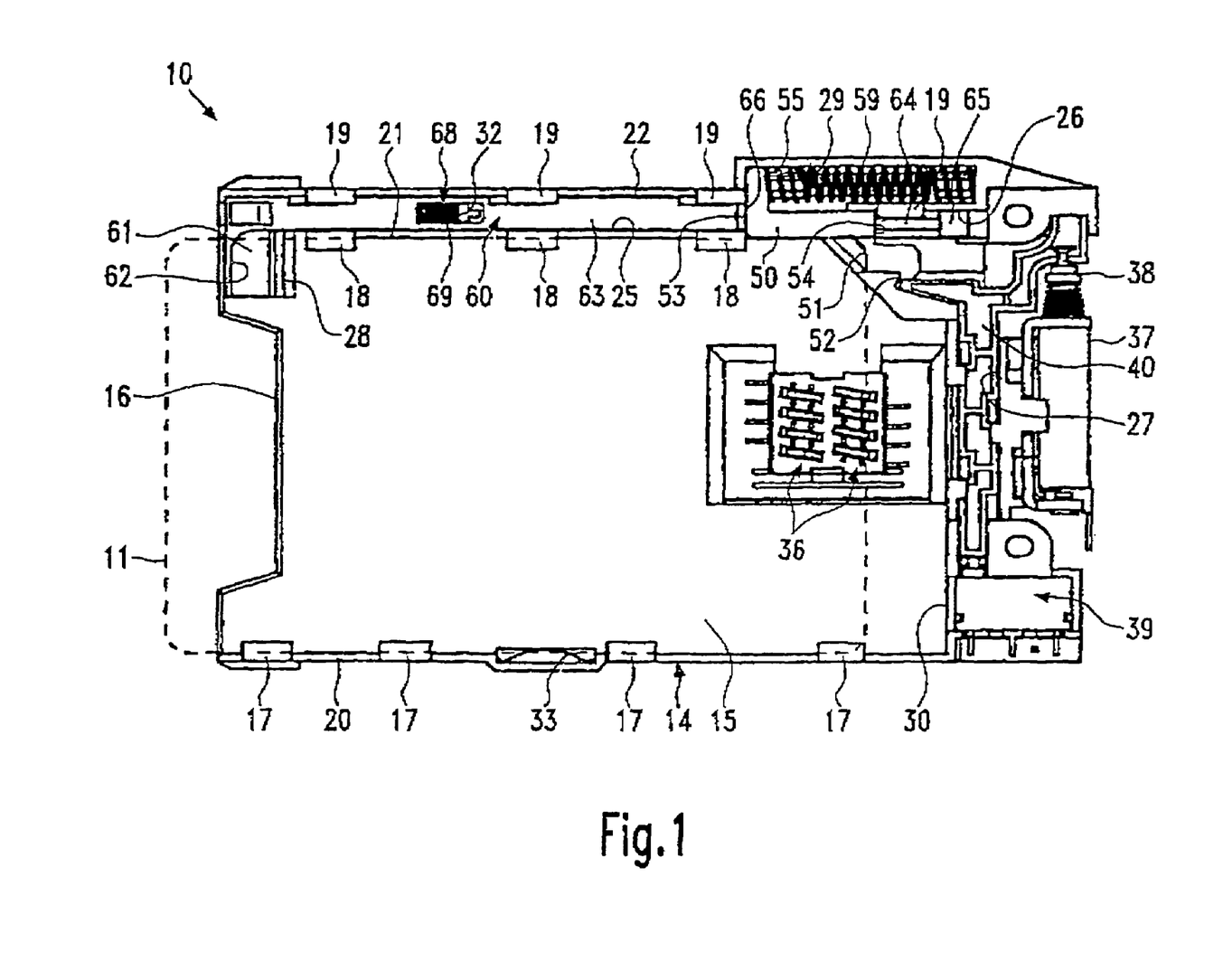
FIG. 1 is a top plan view of upper surface of a first embodiment of a pushmatic smart card connector shown without a lid and in the unlocked condition.
Figure 2:
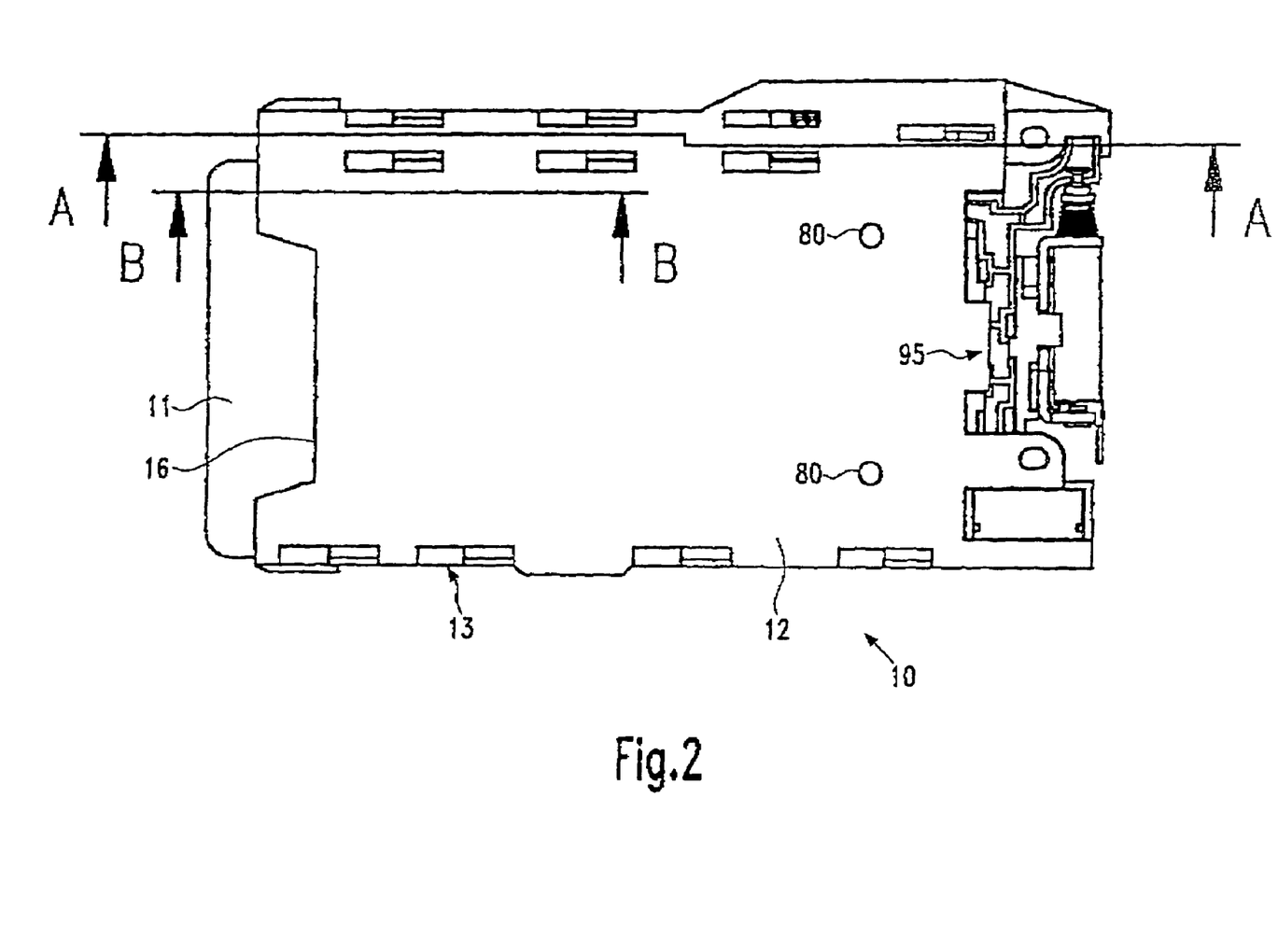
FIG. 2 is a representation similar to FIG. 1 showing the housing and the cover.

In FIGS. 1 and 2, it is shown that the smart card connector 10 comprises a housing 13 preferably in the form of a planar, preferably plate-shaped card support element or a bottom plate 14 and a cover 12 (see FIG. 2). The bottom plate 14 comprises at its upper surface a planar card support surface 15 on which the smart card or card 11 is located, as is shown with dotted lines. The planar card support surface 15 forms together with the cover 12 a card receiving space; in a recess of the planar card support surface 15 contact elements 36 are located for contacting the card contacts.

The housing 13 as well as the bottom plate 14 comprise two longitudinal edges as well as a front and a back transversal edge. The front transversal edge, the planar card support 15 and the cover 12 define an opening 16 for inserting the card 11. The bottom plate 14 comprises at a longitudinal side a longitudinal rib 20 and on the oppositely located longitudinal side longitudinal ribs 21 and 22 which extend parallel to the longitudinal direction. The longitudinal rib 21 is spaced with respect to longitudinal rib 22 towards the center of the bottom plate. The longitudinal ribs 20 and 21 form the lateral limiting edges for the card receiving space. The longitudinal edges 21 and 22 form a guide groove 25 for receiving and guiding a card locking slide 60. On the longitudinal ribs 20, 21 and 22, there is at least one, however, preferably there are several cover holders 17, 18 and 19, which together with openings provided at the cover 12 form a bayonet-type closing means. By means of the bayonet-type closing means, during the assembly of the smart card connector, the cover is placed on the bottom plate 14 and is then moved into the position shown in FIG. 2. In the course of this action, the cover 12 comes into engagement with a detent element 95 on the bottom plate 14 at the time the movement takes place in the direction towards the transversal edge.

An extension 26 of the guide gap 25 is formed in the rearward transversal edge in the bottom plate 14. Preferably, a guide groove 27 extends perpendicularly to the guide gap 25. The guide groove 27 extends preferably parallel to rear transversal edge of the bottom plate 14. The straight guide groove 27 is adapted to receive and guide the locking slide 40.

The bottom plate 14 comprises card abutment means 30 which extend parallel to rearward transversal edges of the bottom plate. At the time the card 11 is inserted into its reading position into the housing 13, it abuts at the abutment 30. Parallel to the extension 26 of the guide groove 25, there is a spring receiving chamber 29 provided which is adapted to receive a card ejection spring 59. In the area of the front transverse edge of the bottom plate 14, a recess is provided which comprises a cam or a curve 28 for receiving and guiding a locking arm 61 formed at the card locking slide 60. In the area of the guide groove 25, there is also a spring support 32; the spring support which is located in receiving recess 68 of the card locking slide 60 comes into abutment within optional pressure spring 69. The optional pressure spring 69 serves to avoid noise when vibrations occur due to tolerances.

The longitudinal rib 20 forms a bulge in which a holding spring 33, preferably designed as a leaf spring, is arranged which prevents the expulsion of the card 11 when the card 11 is moved out of its reading position by means of the card ejection slide 50. The bulge also serves to lock the card 11 in the inserted locked condition in the reading position so as to avoid any noise. By means of the holding spring 33, the card 11 is in abutment with the longitudinal rib 21 and thus the play of the card 11 is eliminated. Card 11 is thus in a defined position.

When inserting the card 11 into the smart card connector 10, then the card ejection slide 50 is moved—at the time card 11 is in abutment with a card slide abutment 51 of the card ejection slide 50—from a rest position against the force of the card ejection spring 59 applied to the card ejection slide 50 into a locking position. In the locking position, a detent nose 52 provided at the card ejection slide 50 comes into engagement with the locking slide 40 and is thus held in the locking position (shown in FIG. 8 through 15). A solenoid 37 is located in transverse direction, i.e. 90° with respect to the card 11 insertion movement and thus extends parallel to the direction of movement of the locking slide 40. The solenoid's pulling armature 38 is coupled to the to the locking slide 40 such that the locking slide 40 moves, freeing the card ejection slide 50 and moves back to the rest position and moves or slides the card 11 out of the housing 13 so that the card 11 can be grasped. The card ejection slide 50 is provided for this purpose with a card pushing abutment 51 which comes into engagement with the corner of an edge of the card 11. The card ejection slide 50 also comprises a spring support 55 of the card ejection spring 59. The card ejection slide 50 comprises on its bottom side a longitudinal groove adapted to receive a narrower section of the card locking slide 60, which is in substance longitudinal and of single-piece design. The card locking slide 60 extends parallel to the side edge of the housing 13 and is in substance placed in the guide groove 25. The card locking slide 60 comprises at its frontal area, i.e. in the area of frontal transverse edge of the bottom plate 16, at its front end a locking arm 61 extending parallel to the transversal edge of the bottom plate 14 and comprising a locking edge 62 which comes into engagement with the rear edge of the smart card 11 at the time the card is completely inserted into the smart card connector; thus the card is locked in the reading position. The card locking slide 60 further comprises an actuating arm 63 which is of single-piece design and which extends perpendicular to the locking arm 61. The actuating arm 63 extends in the groove 25 in the direction of the backward transversal edge of the housing. The actuating arm 63 comprises a dimensionally reduced section 64. At the end of the reduced section 64, a rounded cylindrical bearing body 65 is provided. At the time the card 11 is inserted, the card locking slide 60 is drawn by the card ejection slide 50 into the card locking position. Actually, the card ejection slide 50 slides initially along the reduced section 64 of the card locking slide 60 without initially moving the locking slide 60. A card locking abutment 54 is provided by the card ejection slide 50. Shortly before the card 11 will reach its reading position, a card locking abutment 54 will come into engagement with the bearing body 65 and moves said body 65 into the direction of insertion of the card 11. Thus, the other end of the card locking slide 60 is also drawn into the direction of insertion of the card 11 and thus the locking arm 61 is moved upwardly towards the cover 12 due to the curve 28 provided in the bottom plate 14. This locking operation is shown in FIG. 3 to 6 (unlocked position or rest position) and FIG. 10 through 13 (locked position or reading position). This is clearly shown in the respective cross-sectional views. In the locked position, the card ejection slide 50 is blocked or locked by means of the locking slide 40 and locking also occurs of the card locking slide 60. Thus, the card 11 is safely locked in housing 13 and is particularly secured against unauthorized removal. Due to the arrangement of the locking slide 40 as well as the solenoid 37 transversely to the direction of insertion of the card, a shook-proof locking is achieved. Following a release of the locking slide 40, which is carried out preferably by electromagnetic means, the card ejection slide 50 is moved, due to the spring force of the card ejection spring 59, into the rest position and thus the card 11 is ejected. During ejection of the card 11, the card will carry along the card locking slide 60 by means of the locking edge 62 and thus the card locking slide 60 is moved into its rest position or unlocking position. The cover 12 is provided with guide elements 91 and is mounted on the housing. The guide elements 91 are then above the sloping recess, defining by the cure 29. The guide elements 91 (see FIGS. 3, 5, 10 and 12) arranged in the cover 12 will guide the forward end of the card locking slide 60 with its locking arm 61 into the recess in the bottom plate 14 and hold the card locking slide 60 in the unlocked position in said recess.

After the card 11 is ejected, then the spring-loaded card ejection slide 50 holds the locking slide 60 in its unlocked position because a card unlocking abutment 53 formed by the card ejection slide 50 abuts at a unlocking abutment 66 formed by the transition between the reduced section 64 of the actuating arm 63. Thus, the card chamber is not blocked and a card 11 can be inserted at any time.

The card locking slide 60 comprises in its actuating arm 63 a recess or a pressure spring receiving chamber 68. The card ejection slide 50 and the locking slide 40 are further designed such that the locking operation can be securely detected by means of a switch 39 arranged on the bottom plate 14.

Attention is drawn to advantages achieved with the smart card connector designed according to the invention: the smart card connector can have a flat design and comprises a cover for covering movable parts. By means of the arrangement of the locking slide 40 and the locking solenoid, respectively, transverse with respect to the direction of insertion of the card 11 provides, a shock-resistant design is provided. Due to the locking mechanics and the combination of the card locking slide 60 with the card ejection slide 50, a second spring is not necessary. Further, the locking mechanics can be located on one side of the housing 13 without requiring much space. By designing the card ejection slide 50 and the card locking slide 60 as separate elements, it is possible to achieve a large ejection path and stroke, respectively, of the card. Thus, the card 11 can be ejected relatively far out so that it can be grasped easily by the fingers and can be easily removed. Moreover, the inventive design of the smart card reader provides for a short locking path. As a consequence, if the card 11 is in its locked condition, it is located in the card receiving space enclosed by the housing, the short design of the smart card connector notwithstanding. This allows locking of the card 11 in the smart card connector 10 such that it is safe with respect to manipulations.

Figure 16:
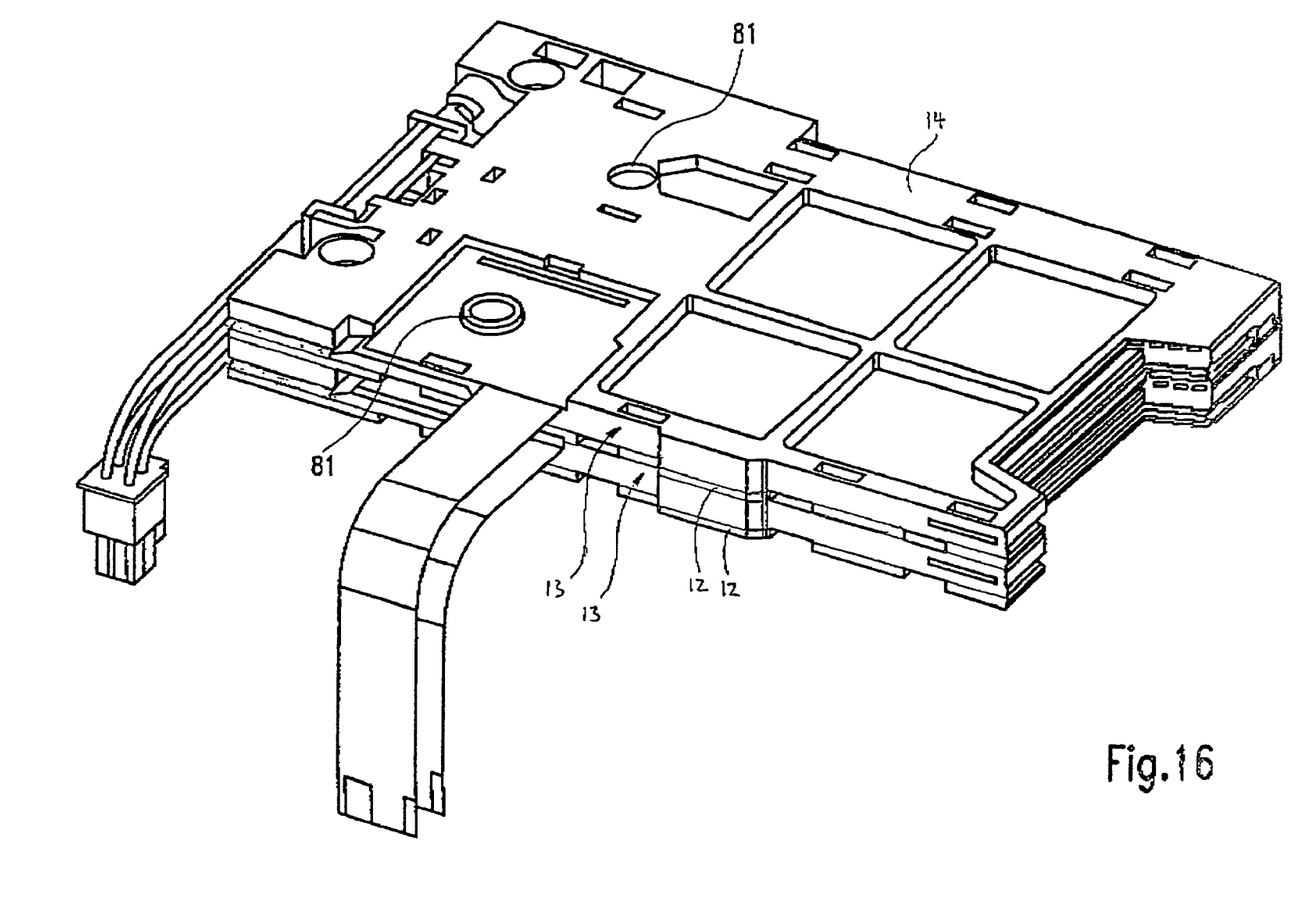
FIG. 16 a perspective view of the bottom side of a smart card connector which is stacked on to a second smart card connector.

The cover 12 has, as is shown in FIG. 2, two mushroom-like detent noses 80. These detent noses 80 are adapted for engagement, in case more smart card connectors 10 of the invention are stacked on each other, with detent nose receiving openings 81 (see FIG. 16) provided at the lower surface of the bottom plate 14. FIG. 16 discloses a perspective view of the bottom side of a stack of two smart card connectors of the invention. The mushroom-like detent noses 80 provided on the cover 12 are optional and can be removed (broken off) so as to provide for a structural design of the smart connector as low as possible.

Figures 3, 4:
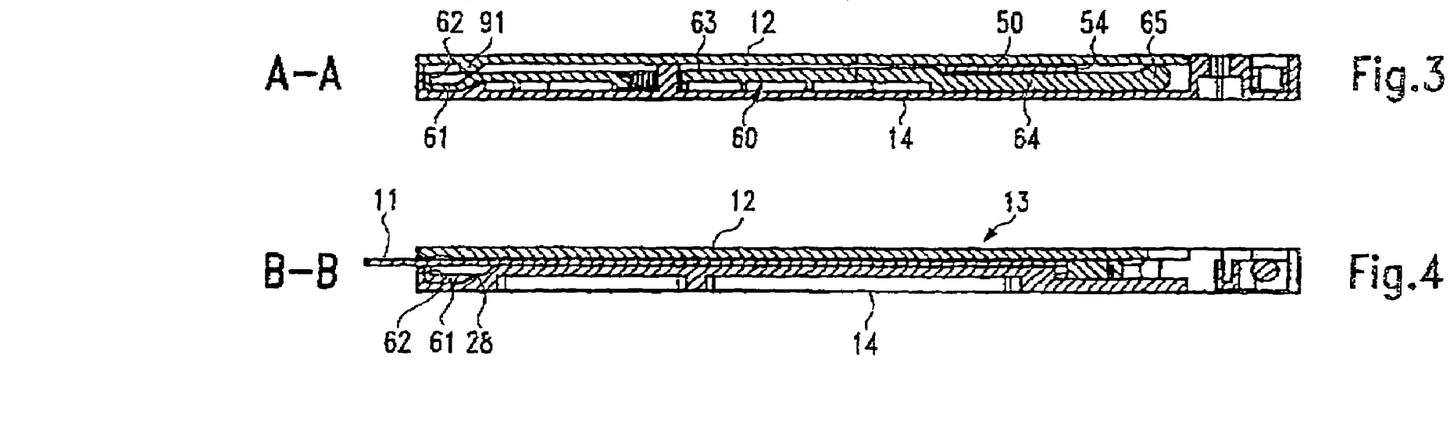
FIG. 3 a sectional view along line A-A in FIG. 2.
FIG. 4 a sectional view along line B-B in FIG. 2.
Figure 5:
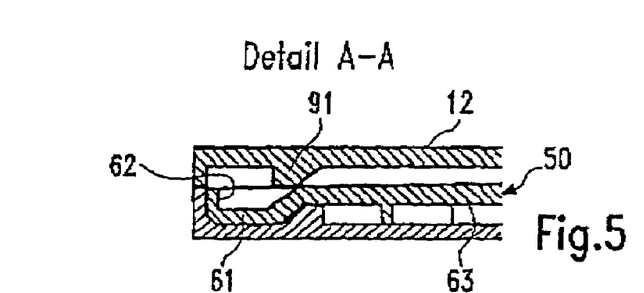
FIG. 5 an enlargement of a detail of the left part of the sectional view shown in FIG. 3.
Figure 6:
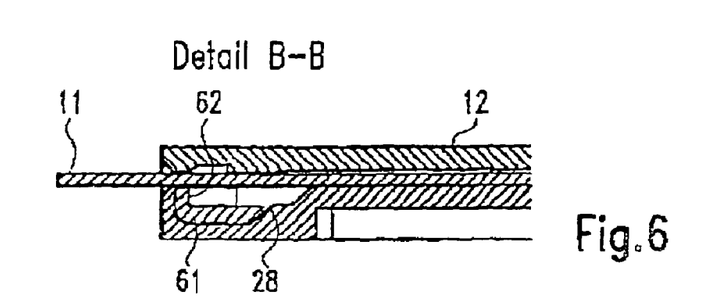
FIG. 6 an enlargement of a detail of the left part of the sectional view of FIG. 4.
Figure 7:
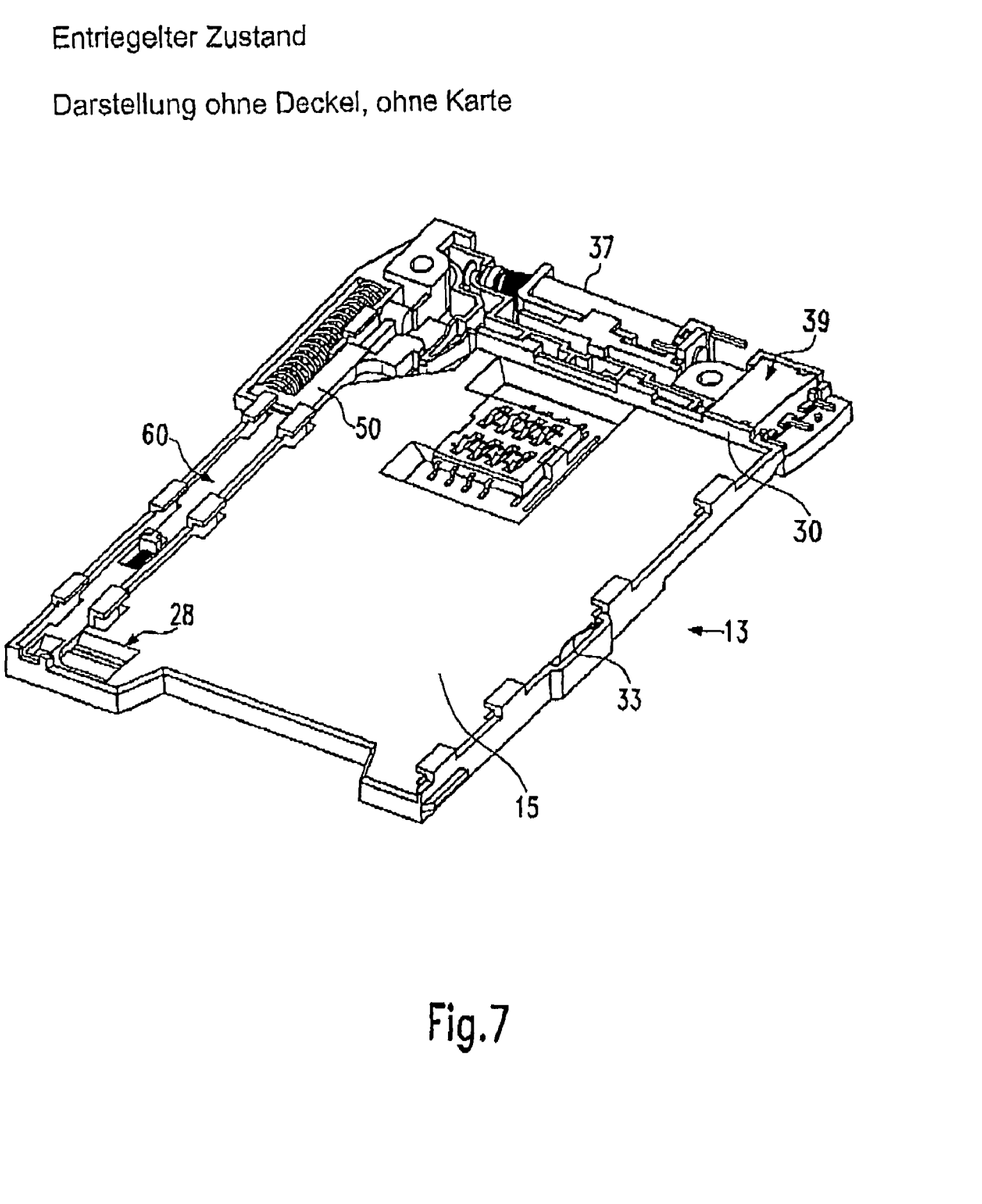
FIG. 7 a perspective view of the smart card connector shown in FIG. 1.
Figure 8:
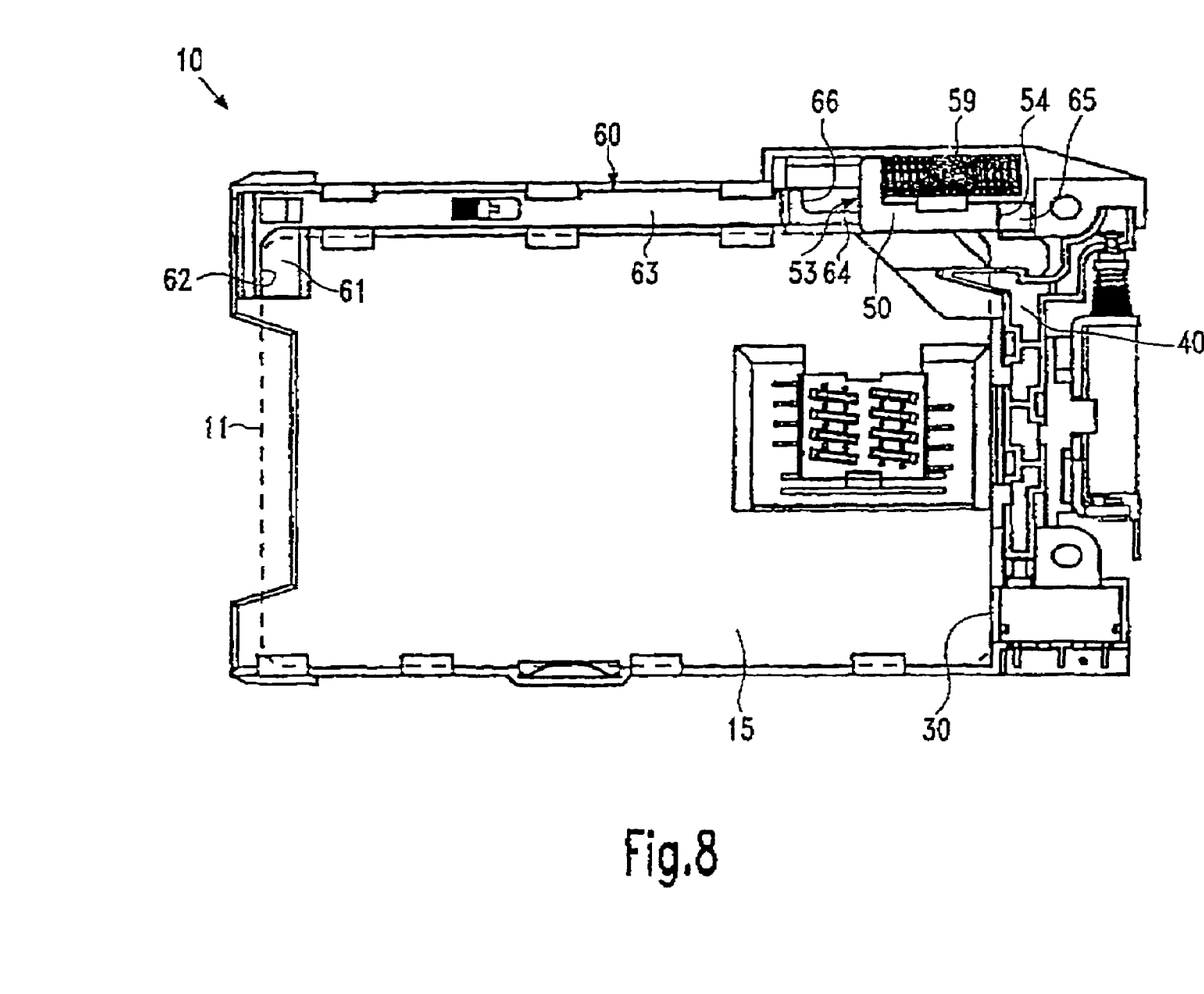
FIG. 8 a representation similar to FIG. 1, here, however, showing the locked condition of the smart card connector.
Figure 9:
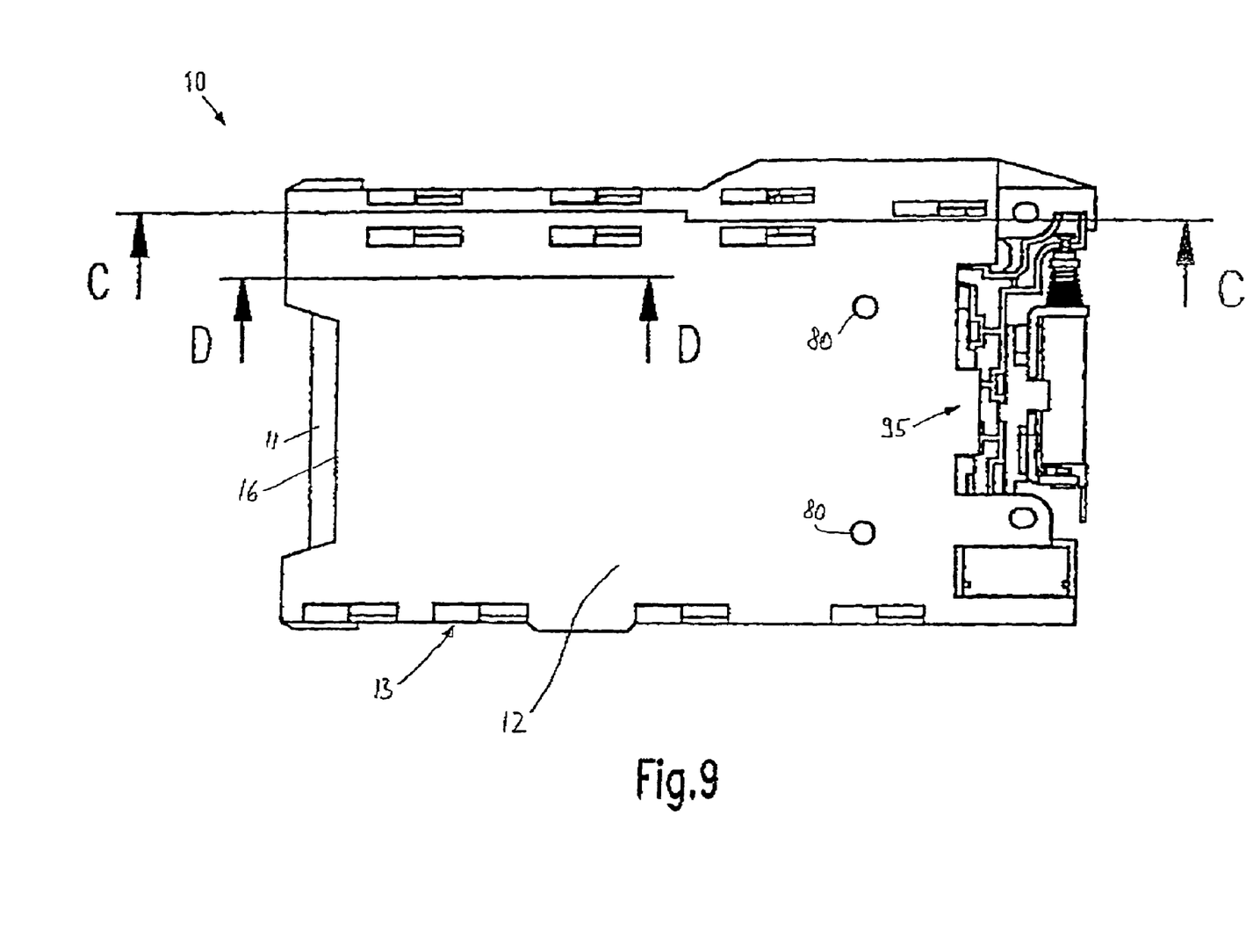
FIG. 9 a representation similar to FIG. 8 with the cover also being shown.
Figure 10:
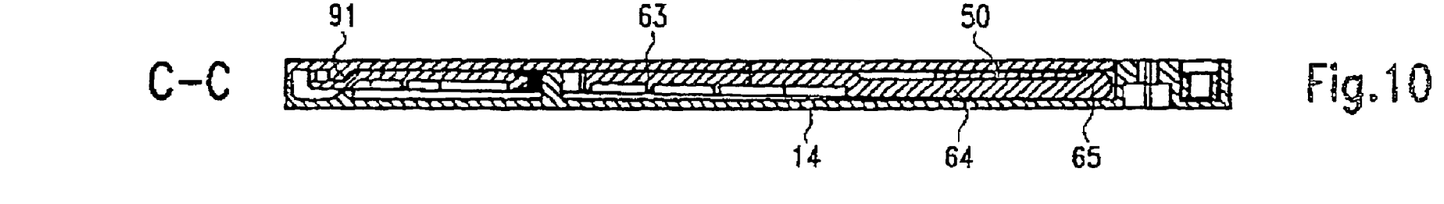
FIG. 10 a sectional view along line C-C of FIG. 9.
Figure 11:
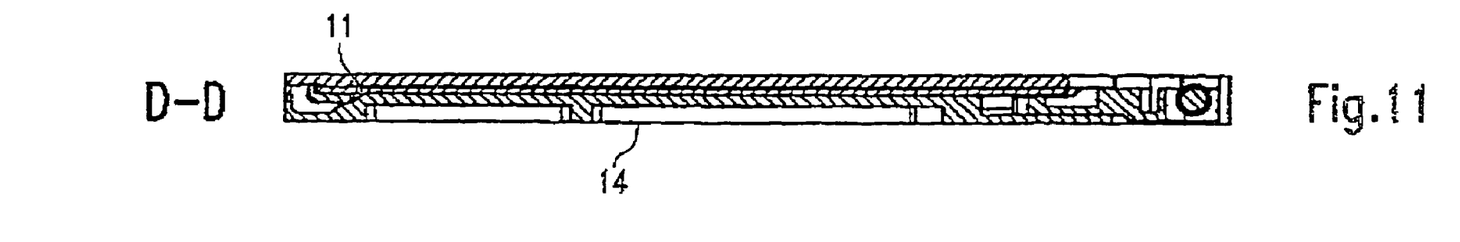
FIG. 11 a sectional view along line D-D of FIG. 9.
Figure 12:
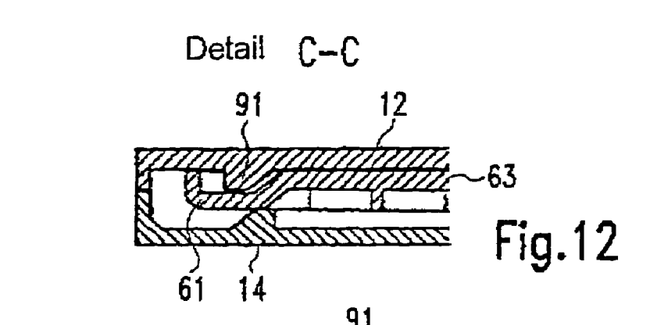
FIG. 12 an enlargement of the left part of FIG. 10.
Figure 13:
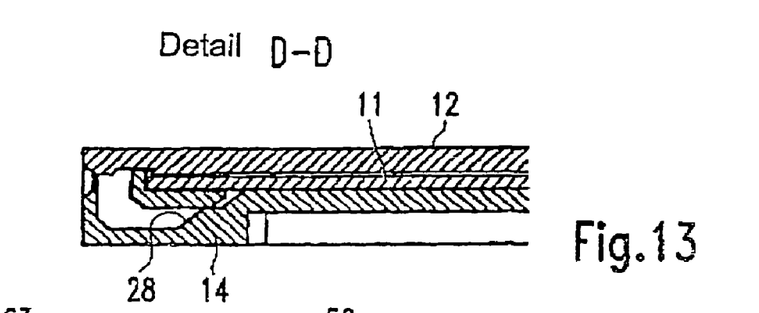
FIG. 13 an enlargement of the left part of FIG. 11 with the card locking slide in a locking position of the card.
Figure 14:
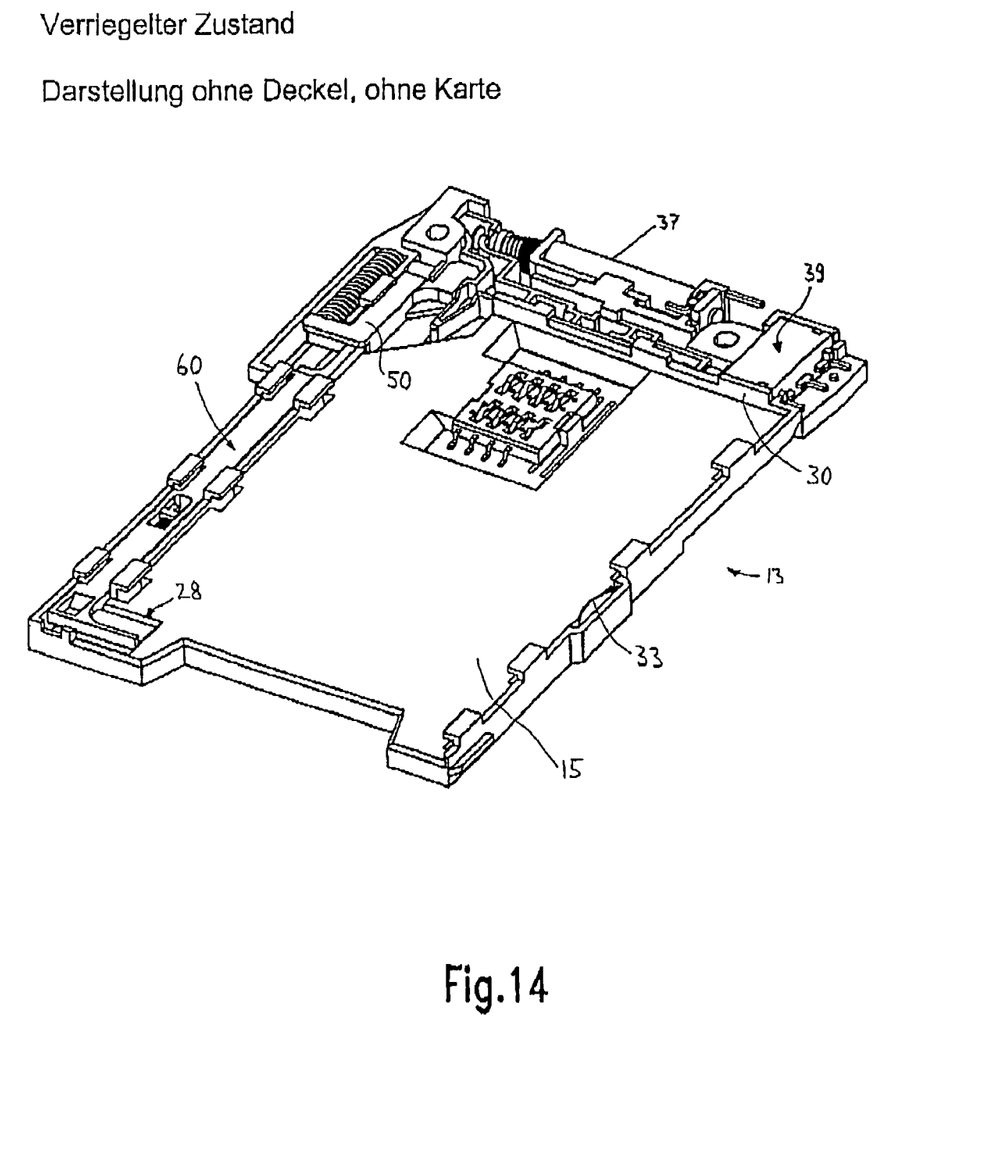
FIG. 14 a perspective view of FIG. 8.
Figure 15:
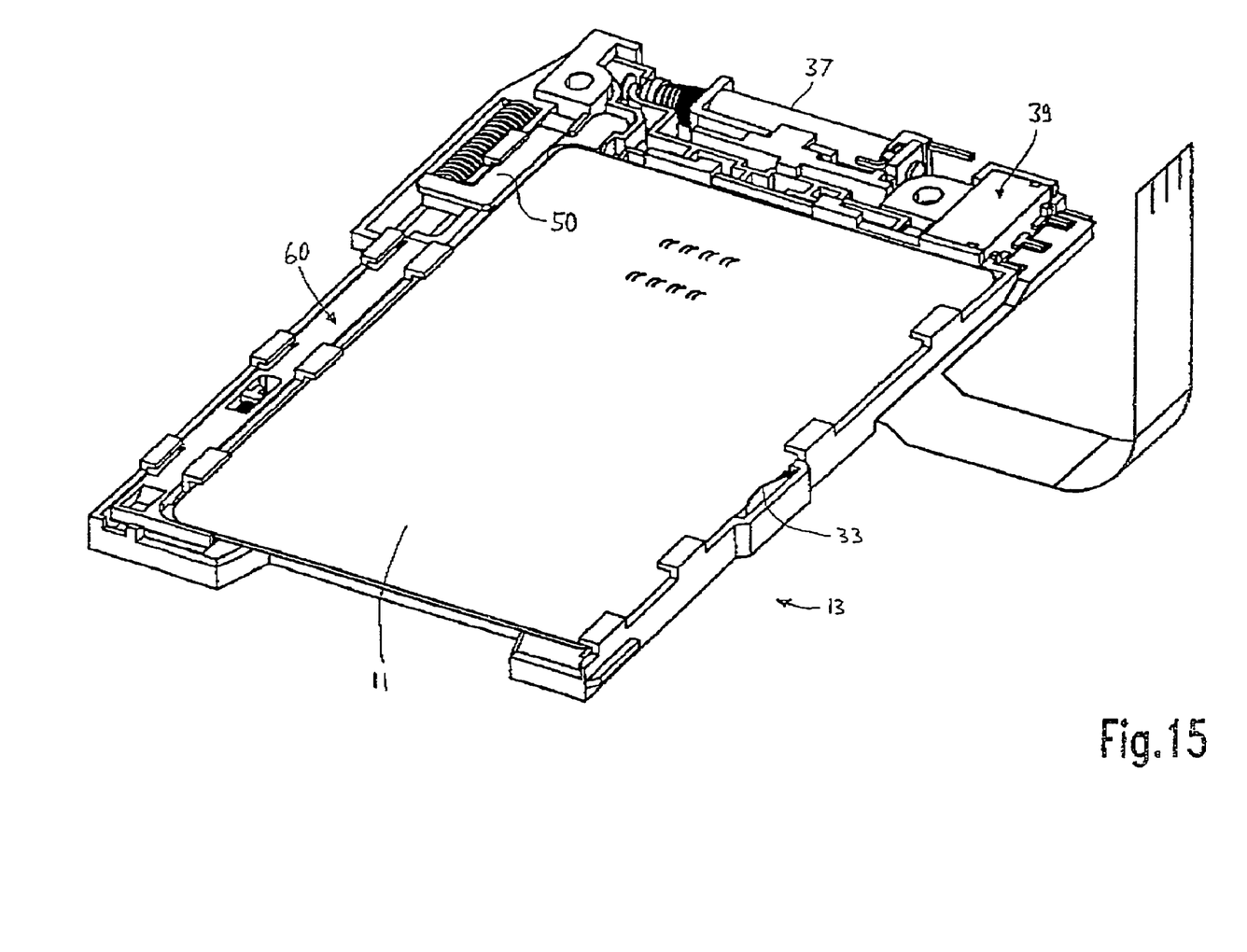
FIG. 15 a perspective view similar to FIG. 14, but with the smart card connector shown with an inserted card.

As can be seen from a comparison between the sectional views of FIG. 3 through 10, the card locking slide 60 pivots or rotates during the movement from the rest position shown in FIG. 3 into the locking position shown in FIG. 10 only slightly about the rotary slide bearing 65. This rotation is caused by the curve 28 provided at the bottom plate 14.

LIST OF REFERENCE NUMERALS

10 Smart card connector
11 Card
12 Cover
13 Housing
14 Bottom plate
15 Planar card support surface
16 Opening
17 Cover holding means
18 Cover holding means
19 Cover holding means
20 Longitudinal rib
21 Longitudinal rib
22 Longitudinal rib
25 Guide groove
26 Guide groove (extension of 25)
27 Guide groove for the locking slide
28 Curve
29 Spring receiving chamber
30 Card abutment
32 Spring support
33 Holding spring
36 Contact elements
37 Solenoid
38 Pulling armature
39 Switch
40 Locking slide
50 Card ejection slide
51 Card slide abutment
52 Detent nose
53 Card unlocking abutment
54 Card locking abutment
55 Spring support
59 Card ejection spring
60 Card locking slide
61 Locking arm
62 Locking edge
63 Actuating arm
64 Reduced section
65 Rotary slide body
66 Unlocking abutment
68 Pressure spring receiving recess
69 Pressure spring
80 Mushroom-shaped detent nose
81 Detent nose receiving opening
91 Guide element
95 Detent element

The invention claimed is:

1. A pushmatic smart card connector, comprising:
a housing adapted to receive a smart card in a reading position, said smart card having two longitudinal edges and a front edge as well as rear edge, wherein, in said reading position, contact elements arranged in the housing are directly or indirectly in contact with contacts provided on said smart card;
a card ejection slide movably mounted in said housing between a rest position and a locking position, said card ejection slide being moved in an insertion direction out of said rest position into said locking position due to insertion of the smart card, said movement in the insertion direction being against a force of a card ejection spring acting on said card ejection slide;
a locking member adapted to lock said card ejection slide in the locking position and to release said card ejection slide out of the locking position so as to eject the smart card; and
a card locking slide movably mounted in said housing between a rest position and a locking position, said card locking slide being moved in the insertion direction by the card ejection slide so as to come into engagement with the rear edge of the smart card when said smart card is inserted into its reading position and to lock the smart card in the reading position,
wherein, during the insertion of the smart card, the movement of the card ejection slide from the rest position into the reading position initially causes no movement of the card locking slide so that the card ejection slide has a larger path of movement in the insertion direction than the card locking slide.

2. The smart card connector of claim 1, wherein:
the housing comprises a card support element and a cover; and
the locking member and the card locking slide are supported on said card support element.

3. The smart card connector of claim 2, wherein the card support element is plate shaped.

4. The smart card connector of claim 1, wherein the card ejection slide, the locking member, and the card locking slide are all supported by the housing for a linear sliding movement.

5. The smart card connector of claim 1, wherein the card locking slide and the card ejection slide are arranged in a line along a side edge of the housing.

6. The smart card connector of claim 1, wherein the locking member includes a locking slide extending parallel to a transverse edge of the housing.

7. The smart card connector of claim 1, further comprising a solenoid disposed transversely with respect to the insertion direction of the smart card and thus parallel to the direction of movement of the locking member, wherein an armature of the solenoid is coupled to said locking member.

8. The smart card connector of claim 1, wherein, at an upper surface of the housing, guide grooves are provided for the locking member, the card ejection slide, and the card locking slide.

9. The smart card connector of claim 1, wherein the card ejection slide and the card locking slide are designed such that, for an initial movement of the card ejection slide toward the locking position, the card ejection slide does not move the card locking slide, and such that movement of the card locking slide due to the card ejection slide is caused only shortly before the locking position is reached and the card locking slide is then in engagement with a rear edge of the smart card.

10. The smart card connector of claim 9, wherein the card locking slide is coupled to said card ejection slide.

11. The smart card connector of claim 9, wherein the card ejection slide is axially mounted on a reduced section of the locking slide.

12. The smart card connector of claim 1, wherein the card ejection slide, the locking member, and the card locking slide are covered by a cover.

13. The smart card connector of claim 1, wherein the card locking slide is controlled by a cam or curve and is lifted at the end of the insert movement and thus extends behind the smart card.

14. The smart card connector of claim 1, wherein, due to the larger stroke or path of movement of the card ejection slide, the card ejection slide ejects the card sufficiently far out of the smart card reader that it can be grasped with the hand.

15. The smart card connector of claim 1, wherein card movement does not require a slide means.

16. A pushmatic smart card connector, comprising:
- a card support element supporting a set of contact elements for contacting contacts on a smart card;
- a card ejection slide that is reciprocally mounted between an ejected position and an inserted position, said card ejection slide being moved from said ejected position to said inserted position in a direction of insertion of the smart card into the card support element, wherein said card ejection slide is biased into the ejected position;
- a card ejection slide locking element that is movably mounted at the card support element for movement between a slide locking position and a slide unlocking position;
- a card locking slide that is reciprocally mounted to move between a card unlocking position and a card locking position, said card locking slide being moved from said card unlocking position to said card locking position in the direction of insertion of the smart card into the card support element; and
- a slidable coupling between the card ejection slide and the card locking slide such that the card ejection slide can move relative to the card locking slide, wherein the card locking slide is biased into the card unlocking position by movement of said card ejection slide into the ejected position and into the card locking position by movement of said card ejection slide into the inserted position.

\* \* \* \* \*